United States Patent Office 2,836,485
Patented May 27, 1958

2,836,485

HYDROMETALLURGICAL PRECIPITATION OF METAL POWDER

Felix A. Schaufelberger, Rye, N. Y., and Walter R. McCormick, Fredericktown, Mo., assignors to Chemical Construction Corporation, New York, N. Y., a corporation of Delaware No Drawing. Application March 16, 1956
Serial No. 571,893

10 Claims. (Cl. 75—.5)

This invention is concerned with the precipitation of powdered non-ferrous metals from aqueous solutions of their salts by the action of reducing gases at elevated temperature and superatmospheric pressure. More particularly, it relates to an improvement in such processes to obtain such non-ferrous metals as nickel and cobalt as elemental metal powder.

Still more specifically, it is a principal object of the invention to develop an improved process of hydrometallurgically precipitating suitable seeding powder from a metal salt solution under specific operating conditions and using resultant precipitate as seeding material in precipitating additional amounts of metal under the same or different conditions to obtain the desired product metal powder.

In general, this object is accomplished by carrying out the seed-producing reduction at above about 125° C., under a positive partial pressure of reducing gas and a total pressure sufficient to prevent boiling. This is done on an ammoniacal, ammonium salt solution of dissolved metal. This solution has a controlled solutes content and has suspended therein from about one to about ten grams per liter of metal as a basic compound thereof which has been precipitated in situ. Under these conditions, a product powder of the desired purity and small average diameter is obtained. This powder is well suited for seeding purposes in subsequent reductions.

In recent years, there has been a continually increasing commercial interest in the hydrometallurgical recovery of such non-ferrous metals as nickel and cobalt from various ores, ore concentrates, plant by-products and secondary metals. Various proposals have been made, not only in leaching methods, but also in methods of separately or cojointly precipitating metal powders from leach solution and in overall processes combining these features.

It is with the precipitation of metals from solution that this invention is concerned. In the past, non-ferrous metal powders have been precipitated with varying degrees of success by gas reduction of both acidic and ammoniacal solutions. However, in order to induce precipitation of the metal as powder, careful control of the solutes content is re-required—both in initiating and in maintaining effective reduction. This degree of careful control is generally difficult to maintain for extended periods.

It has also been shown that the use of seed metal in such cases can be decidedly helpful, particularly in the cases of nickel and cobalt. However, a combination of careful control and proper seeding is necessary to insure prompt initiation of reduction to elemental metal and to continue the reduction reaction to the extent desired. It is necessary to obtain suitable seeding powder which not only will promote reduction but which, in use, will not result in a product deficient in one or more of such essential properties as size, density and purity or in the extent of the yield.

Metal powder for seeding production reduction runs, must not only be provided in adequate amount but must also be sufficiently fine in particle size. Such seed has been difficult to obtain.

Even though other substances of similar crystal lattice dimensions may be used, in seeding a solution to obtain useful product metal, it is often desirable to utilize a powder of the same metal which will constitute the product. This simplifies many problems, since no extraneous matter is introduced. This is particularly important if metal production is to be operated continuously.

For this reason, many different operations have been tried to produce fine metal particles for use as seed in reduction operations. These include such operations as: mechanical grinding; chemical reduction of metal salt solutions by strong reducing agents such as hypophosphites, hydrazine and the like; decomposition by heating of certain compounds such as $Ni(CO)_4$; and limited reduction of acidic solutions followed by reduction at a higher pH. Recycling product nickel powder from the final or one of the intermediate reduction stages has also been suggested.

Preparation of seed metal by gas reduction of metal salt solutions was not generally considered a likely prospect for commercial development because it involved the problems which the use of seed was intended to overcome. To accomplish gas reduction to seed metal requires the presence of satisfactory nucleating material. If seed precipitation by gas reduction is not properly nucleated, reduction may be too slow or too incomplete, or may result in the deposition of useless adherent deposits on the walls of the reduction vessel.

According to the present invention a procedure has been developed which will, prior to the actual seed metal deposition, produce in situ fine particles which although not metal nuclei per se are apparently converted thereto during reduction and in any case are capable of promoting deposition of fine metal powder suitable for use in seeding subsequent reductions to product metal powder.

For purposes of this discussion, an ammonical solution of nickel and ammonium sulfates presents typical situations and problems. Taking such a solution as illustrative, it is first treated to precipitate in situ the requisite amount of the dissolved metal as suspended, finely-divided basic compound thereof.

Very little is definitely known about the nature and structure of the materials which precipitate under the operating conditions used at this stage in the process of the present invention. Such precipitate will be referred to herein as a basic metal sulfate, even though its exact composition of oxides, hydroxides and sulfates is uncertain and appears to vary under different conditions. Precipitates can be produced which vary from being substantially unreducible to those which are very easily reducible. For this reason, an analysis of the precipitate is not particularly helpful in defining the invention.

Practically, it is simpler and more useful to define the conditions of precipitation. Certain operating limitations, if observed, will produce the desired result.

Both the composition of the solution from which the initial solid is precipitated and the precipitation procedure are important. Variations in either have an effect on two factors important in successful operation. The first factor is that of providing the correct amount of precipitate at the initiation of gas reduction. The second factor is the nature of the basic precipitate. The latter must be fine in size, well dispersed in the liquor and reducible to metal without undue difficulty.

The importance of the amount of basic precipitate to be formed before starting actual reduction to metal is easily demonstrated. When the quantity is inadequate, insufficient nuclei form when reduction begins. The result is production of useless plate and foil in the vessel. If too much precipitate is present, too many nuclei form. This results in agglomeration and again in useless deposition on the vessel walls. Quantitatively, according to the present invention, the amount of precipitate should correspond to from about one to about ten grams of metal per liter. Operation in the middle portion of this range appears to be a good general practice.

Both the amount of precipitate and its structure appear in some manner to be effected not only by the procedure in which it is precipitated but also by the solutes content of the solution. Accordingly, a few observations on the latter should be noted at this point. This in turn involves a brief consideration of the more common sources of solutions to be treated.

Usually, they originate, directly or indirectly, from leaching ores of the metals either as their sulfides or as weathered silicates. Less often, scrap and secondary metals are leached. Leaching may have been either basic or acidic but is generally under oxidizing conditions. Resultant dissolved salts are usually sulfates, either derived from the most commonly used leaching acid or from oxidation of sulfide sulfur in the ore.

Various other possible components of the ore, for example, such metals as iron, aluminum, copper and the like and such metalloids as sulfur, arsenic, antimony, tellurium, etc., when present, are dissolved to some degree. Accordingly, any such extranous solutes are then collected or discarded, as may be desired, to obtain a solution of the metal or metals of interest. In the course of these latter treatments, the hydrogen ion content of the liquor usually is adjusted, often several times.

If leaching is basic, it is usually ammoniacal. Caustic soda, though at an economic disadvantage, is sometimes used. In such cases, pH adjustment is usually with sulfuric acid, either provided per se or as process liquors accumulated from various sources during plant operation. Sulfate ions are produced during leaching of ores of metal sulfides. In such cases, there is no necessity to introduce other acidic ions, although it is sometimes done.

Similarly, if leaching is acidic, sulfuric acid is usually used or produced during leaching, and pH adjustment is usally done with ammonia. Again caustic soda may be occasionally encountered. Weathered silicate ores, however, are often leached with ammonium carbonate solutions. Sulfates and carbonates are therefore the most common salts. Because of the corrosion problems involved and the greater difficulty in reducing chlorides, both chlorides and nitrates may be, but seldom are, encountered.

To generalize, then, a typical solution to be treated according to the present invention may be either acidic or basic. The acidic ion is usually sulfate, less often, carbonate. The metals of interest are usually nickel or cobalt, dissolved as their salts such as $NiSO_4$, $CoSO_4$ or as salts of metal ammines, which may be represented as $Me(NH_3)_x$ wherein "Me" is the metal ion and "$x$" varies from about 1.5 to about 6. The illustrative nickel solution also contains ammonium sulfate and usually some "free" ammonia. The latter term includes any dissolved $NH_3$, any $NH_3$ bound in the ammines and any unneutralized ammonium hydroxide.

Treatment according to the present invention involves control of factors which effect the solubility of the basic sulfate. Principally these are, the amounts of metal, ammonia and ammonium salt in solution, and the temperature and time of treatment. While each may vary, for any one system, they must be balanced each with the other.

The amount of nickel in solution may vary considerably. When it is less than about ten g./l. (grams per liter) it is usually desirable to concentrate the metal as by precipitating it as some insoluble salt, such as a sulfide, and releaching the latter to obtain a more concentrated solution. On the other hand, it may be much higher. Solutions may contain as high as 130 g./l. or more of nickel at some conditions of temperature. Solutions of about 20–80 g./l. of cobalt and/or nickel are those frequently encountered and this content is probably typical of most liquors in practical use.

The presence of ammonium sulfate is necessary, both for its effect on the solubility of the basic compound to be precipitated and because it appears to have a desirable buffering effect as the acidic ion content which varies during reduction. A numerical limitation on the amount has little or no significance. A better expression of the limitation is in the proportions of ammonium salt to dissolved metal. Empirically, it has been found that for a specific case, the desired mol ratio of dissolved metal to ammonium salt will be between from about 5:1 to about 5:3 when the preferred conditions of ammonia content, temperature and time are maintained. As noted above, for any one case, the optimum amount within this range depends upon and must balance with the other factors. The ammonium salt content may be reduced by crystallization or increased by direct addition or by neutralizing ammonia or acid.

Actually, the amount of ammonium salt used is primarily determined by its effect on the solubility of the basic metal sulfate. Solubility of the latter increases with increasing contents of ammonium sulfate and free ammonia. The former has been discussed. As to the latter, it must be such that nickel can be reduced to metal. It has been found that mol ratio of $NH_3$ to dissolved nickel of about two is a good practice, although it may be from as low as about 1.7 to as high as 3.0, depending upon other factors.

The actual ratio used must be in accord with the amount of ammonium salt in order that the correct amount of precipitate will form and the remainder of the nickel be soluble and reducible. For cobalt, higher ratios of from about 2.5 to about 4.0 being desirable and above about 3.5 being preferred.

If the solution to be treated contains an excess of ammonia, the latter may be reduced to the desired amount by boiling or by the addition of acid. If the solution is deficient in ammonia more may be added. In the latter case, care should be taken to prevent an excessive ammonium sulfate content. Acid in excess of that amount which will yield the desired amount of ammonium salt must be removed before adding ammonia or else the resultant excess of ammonium sulfate should be removed. After adjusting the ammonia content, for reasons discussed below, a good practice is to have present an excess of at least about ten percent.

This phase of adjustment, then, consists in providing in solution several different correct solutes contents based on the amount of dissolved metal, i. e., the correct mol ratios of (1) ammonium sulfate to dissolved nickel, (2) ammonia to dissolved nickel and (3) ammonia to ammonium sulfate. For each mol/liter of dissolved nickel there should be a selected amount in the range of from about 0.2 mol to about 0.6 mol of ammonium sulfate.

There should be sufficient ammonia to furnish, for the amount of ammonium sulfate present, that mol ratio of ammonia to nickel between about 1.7 and about 3.0 at which at above about 125° C., the necessary 1–10 g./l. of nickel is insoluble.

In many plant liquors ammonia will be present in excess of the amount required to balance the ammonium sulfate content. This is a desirable situation since it permits the use of the preferred method of obtaining the correct amount of basic precipitate. It is desirable to first adjust the ammonium salt content to about the correct value and then adjust the ammonia. As noted above, solubility of the basic compound increases with the ammonia content.

If, after the salt content adjustment, the ammonia content is too low, the basic compound is prematurely precipitated in excessive amount. An excess of ammonia is desired to prevent this. Then, on final adjustment of the ammonia content, the correct amount of basic compound is precipitated at the proper stage in the operation.

The solution is now ready for final ammonia adjustment which consists in establishing that correct content of ammonia for the ammonium salt content so that at the temperature in the range of above about 125° C., at which seed precipitation is initiated, the correct amount of basic nickel sulfate will be freshly precipitated and suspended in situ. This final ammonia adjustment is most easily made by boiling or distillation. If necessary, water may also be removed in this operation. Where ammonia recovery per se is not a factor, further acid addition may be used as an alternative. It has been found that the removal of about 10% excess in this way is desirable. Much more may be removed if present. However, if it is added specifically to be removed at this stage, more than a 50% excess is not helpful.

Depending upon the temperature at which ammonia is finally adjusted, whether by simple boiling at about 100° C. under substantially atmospheric pressure, or under increased pressure at higher temperatures up to the reduction initiating temperature, certain precautions are desirable. For example, in some cases at the lower temperature (100° C.) enough of the desired basic compound may not precipitate. However, at the higher initial reduction temperature of above about 125° C. the necessary amount will be insolubilized. As noted above, solubility of the basic sulfate decreases with increasing temperature. Allowance for this effect must be made in using the lower temperature range in removing ammonia. This may be important where ammonia is adjusted in a different vessel from that used for reduction. If the final temperature rise is made in the latter, there will be no problem of basic compound being deposited in the transfer conduits.

Whether water is to be removed and, if so, how much will be governed by the nickel content. Ordinarily, if the ammonia and ammonium salt contents are properly balanced within the indicated ratio ranges, this factor is not too important. However, for solutions quite low in nickel it may be desirable to remove some water. The amount removed, if possible, should be such that the solution will be slightly oversaturated at the temperature at which reduction is to be initiated.

One other precaution should be noted. As pointed out above, time of treatment is a factor. All of the above conditions have been discussed from the point of view of a normal time cycle. The solution, after adjustment, will contain free ammonia. If adjusted solution is held for an unduly long period at increased temperatures, the basic compound is precipitated in excessive amounts. Even though this excess precipitate can be subsequently reduced to metal, its production causes a number of difficulties. Particularly troublesome is its tendency to cement precipitated metal into agglomerates which are useless as product. Adjusted solution should not be held at reduction temperature more than about fifteen minutes without introducing hydrogen and starting reduction.

Reduction is then carried out on resultant slurry in a normal manner. Thorough agitation during reduction is desirable. Sufficient reducing gas, preferably, hydrogen should be provided to maintain a positive partial pressure throughout. The total pressure will at least slightly exceed that autogenously developed by the solution at the temperature in order to prevent boiling. The temperature may be varied from about 125° C. to about 200°–250° C. Higher temperatures may be used but are generally not warranted in view of the rapid increase in total pressure which must be maintained.

As illustrative of the present invention, the following examples are given. Their intent is descriptive and not by way of limitation.

*Example 1*

A sample of ore concentrate containing sulfides of iron, copper, nickel and cobalt is leached with sulfuric acid at about 200–225° C. Resultant liquor is pressure relieved, adjusted to about pH 4.5 with ammonia and resultant iron-bearing precipitate is filtered off. Copper is precipitated with hydrogen gas at about 150° C. at about 600 p. s. i. and removed resultant clarified liquor is made basic with added ammonia and is found to contain:

| Content: | Gms./liter |
| --- | --- |
| $NH_3$ | 58 |
| $(NH_4)_2SO_4$ | 33 |
| Ni | 26 |
| Co | 4 |

In an autoclave, about 20 liters of solution is boiled to a residual $NH_3$ content of about 22–25 g./l., the evolved ammonia vapor being removed from the vessel. The vessel is then closed, pressurized to about 100 p. s. i. with hydrogen gas, heated to about 180° C. and maintained at about 180–190° C. for some 40 minutes. The vessel is then pressure relieved, cooled and discharged. The precipitate is washed with water, dilute sulfuric acid and again with water and dried. Resultant nickel metal powder is sampled and found to be very fine, of less than five microns in average diameter. No plating is observed on the autoclave.

*Example 2*

Additional samples of the same liquor are treated to reduce the ammonia content to produce an $NH_3Ni$ mol ratio of about three. Seed powder resulting from Example 1 is added to about 20 liters thereof and resultant slurry pressurized to about 100 p. s. i. with hydrogen, heated to about 190° and stirred for about 30 minutes. No "plating" is obtained. Reduction is continued to a residual content of about 2.5 g./l. nickel. Substantially no cobalt is reduced. Residual liquor is decanted leaving a thick slurry which is sampled. After washing and drying, the powder sample assayed about 99.1% Ni. Another 20 liter sample of reduced ammonia-content liquor is added to the slurry and reduction under the same conditions carried out. Again no "plating" is observed and reduction was completed in about 30–35 minutes. Additional samples of liquor are added to residual slurry for a total of six such reductions. The sixth reduction was not complete in 35 minutes. Very little "plating" is observed. Product powder after the sixth "reduction" or "densification" run assayed over 99% nickel, less than 0.05% cobalt and had an apparent density of about 3.4.

In the foregoing examples batch operation is illustrated. The invention however is not so limited. Continuous operation can be maintained by parallel flow circuits. In at least the initial stages, the basic nickel compound would tend to be redissolved by the increasing of $NH_3$ and/or $(NH_4)_2SO_4$ content which is produced as metal is precipitated. Therefore, a separate circuit in which the basic compound is being constantly precipitated for injection of resultant slurry into the main reduction circuit is desirable. In this side circuit, the precipitate would be made in excess of the one to ten g./l. that is desired for batch operation. Conditions in the main circuit should be such that the precipitate does not redissolve. Product slurry is injected into the general reduction circuit at such a rate as to generally maintain the correct amount in the incoming liquor.

Although in the above discussion nickel sulfate has been taken as illustrative, the same general considerations apply to the precipitation of cobalt seed for nucleating material to be used in cobalt precipitation. There is one distinction. The mol ratio range of ammonia to metal was noted above to be generally from about 1.7 to about 4.0. Ratios of about 1.7–2.2 are preferred for nickel although up to 3.0 may be used. For cobalt, the higher ratios of about 2.5–4.0 are used and about 3.5–4.0 are preferred. In general too, the same considerations can be applied to liquors resulting from carbonate leaching. As was also noted above, sodium salts are sometimes encountered. If so, they may be treated in the same general manner. But in adjusting the solution, calculations should be based on producing the same general hydrogen ion concentrations as found when using ammonia rather than on the basis of molar equivalents.

We claim:

1. In the hydrometallurgical precipitation of metal powder by treating a solution of metal salts with hydrogen at elevated temperature and superatmospheric pressure, said metal being selected from the group consisting of nickel and cobalt, the improved self-nucleating reduction which comprises: before initiating the reducing reaction, adjusting said solution to contain a preselected amount of ammonium salt in the range of from about 0.2 to about 0.6 mol thereof per mol of dissolved nickel plus cobalt, that selected content of ammonia which, at a temperature of from about 125° C. to about 250° C., will provide that corresponding mol ratio of ammonia to dissolved metal at which from about 1 to about 10 grams per liter of dissolved metal becomes insoluble, and additional ammonia sufficient to provide at least an excess above said selected ammonia content; treating adjusted solution to remove said excess ammonia; increasing the temperature of the resultant solution to within the range of from about 125° C. to about 250° C., whereby said 1 to 10 grams per liter of metal is precipitated in situ as a finely-divided suspended basic compound to form a slurry; then, reacting the slurry with sufficient hydrogen gas to produce and maintain, at reduction temperature, a positive partial pressure of hydrogen gas and a total pressure at least sufficient to prevent boiling; and with agitation, maintaining resultant heated slurry at a reduction temperature above about 125° C., under said partial pressure of hydrogen until precipitation of metal substantially ceases.

2. In the hydrometallurgical precipitation of metal powder by treating a solution of metal salts with hydrogen at elevated temperature and superatmospheric pressure, said metal being selected from the group consisting of nickel and cobalt, the improved self-nucleating reduction which comprises: before initiating the reducing reaction, adjusting said solution to contain a preselected amount of ammonium salt in the range of from about 0.2 to about 0.6 mol thereof per mol of dissolved nickel plus cobalt, that selected content of ammonia which, at a temperature of from about 125° C. to about 250° C., will provide that corresponding mol ratio of ammonia to dissolved metal at which from about 1 to about 10 grams per liter of dissolved metal becomes insoluble, and additional ammonia sufficient to provide at least an excess above said selected ammonia content; heating adjusted solution at a temperature of at least about 100° C. for only sufficient time to remove said excess ammonia, whereby at a temperature of from about 125° C. to about 250° C., said 1 to 10 grams per liter of metal is precipitated in situ as a finely-divided suspended basic compound to form a slurry; then, reacting the slurry with sufficient hydrogen gas to produce and maintain, at reduction temperature, a positive partial pressure of hydrogen gas and a total pressure at least sufficient to prevent boiling; and with agitation, maintaining resultant heated slurry at a reduction temperature above about 125° C., under said partial pressure of hydrogen until precipitation of metal substantially ceases.

3. The process according to claim 2 in which the metal is nickel and said selected ammonia to dissolved metal ratio is within the range of from about 1.7:1 to about 3:1.

4. The process according to claim 2 in which the metal is cobalt and said selected ammonia to dissolved metal ratio is within the range of from about 2.5:1 to about 4:1.

5. In the hydrometallurgical precipitation of nickel metal powder by treating an aqueous ammoniacal ammonium salt solution which contains dissolved nickel values with hydrogen gas at elevated temperature and superatmospheric pressure, the improved self-nucleating reduction which comprises: before initiating the reducing reaction, adjusting said solution to contain a preselected amount of ammonium salt in the range of from about 0.2 to about 0.6 mols thereof per mol of dissolved nickel, and that amount of ammonia which, at a temperature of from about 125° C. to about 250° C., will provide that corresponding mol ratio of ammonia to dissolved nickel at which about 1 to about 10 grams per liter dissolved nickel becomes insoluble, and at least about a 10% excess of ammonia thereover; then treating so-adjusted solution at a temperature of at least about 100° C. for only sufficient time to remove said excess ammonia; increasing the temperature of the resultant solution to within the range of from about 125° C. to about 250° C., whereby said 1 to 10 grams per liter of dissolved metal is precipitated in situ as finely-divided, suspended basic compound to form a slurry; then, reacting the slurry with sufficient hydrogen gas to produce and maintain, at reduction temperature, a positive partial pressure of hydrogen gas and a total pressure sufficient to prevent boiling; and with agitation, maintaining resultant heated slurry at a reduction temperature above about 125° C. under said pressures until precipitation of nickel metal substantially ceases.

6. The process according to claim 5 in which, during said adjustment, the residual ammonia content is reduced mol ratio of ammonia to dissolved metal without the range of from about 1.7:1 to about 2.2:1.

7. A process according to claim 5 in which the ammonia content of the solution is adjusted, at least in part, by boiling off excess ammonia at about atmospheric pressure.

8. In the hydrometallurgical precipitation of cobalt metal powder by treating an aqueous ammoniacal ammonium salt solution which contains dissolved cobalt values with hydrogen gas at elevated temperature and superatmospheric pressure, the improved self-nucleating reduction which comprises: before initiating the reducing reaction, adjusting said solution to contain a preselected amount of ammonium salt in the range of from about 0.2 to about 0.6 mol thereof per mol of dissolved cobalt, and that amount of ammonia which, at a temperature of from about 125° C. to about 250° C., will provide that corresponding mol ratio of ammonia to dissolved cobalt at which from about 1 to about 10 grams per liter of dissolved cobalt becomes insoluble, and at least a 10% excess of ammonia thereover; then treating so-adjusted solution at a temperature of at least about 100° C. for only sufficient time to remove said excess ammonia; increasing the temperature of the resultant solution to within the range of from about 125° C. to about 250° C., whereby said 1 to 10 grams per liter of metal is precipitated in situ as finely-divided, suspended basic compound to form a slurry; then, reacting the slurry with sufficient hydrogen gas to produce and maintain, at reduction temperature, a positive partial pressure of hydrogen gas and a total pressure sufficient to prevent boiling; and with agitation, maintaining resultant heated slurry at a reduction temperature above about 125° C. under said pressure until precipitation of cobalt metal substantially ceases.

9. A process according to claim 8 in which, during said adjustment, the residual ammonia content is reduced to a mol ratio of ammonia to dissolved metal within the range of from about 2.5:1 to about 4:1.

10. A process according to claim 8 in which the ammonia content of the solution is adjusted, at least in part, by boiling off excess ammonia at about atmospheric pressure.

References Cited in the file of this patent

UNITED STATES PATENTS

| | | |
|---|---|---|
| 2,647,820 | Forward | Aug. 4, 1953 |
| 2,753,257 | Nasher et al. | July 3, 1956 |